_United States Patent Office_ 3,053,794
Patented Sept. 11, 1962

3,053,794
ISOBUTYL HYDANTOIC ACID-FORMALDEHYDE REACTION PRODUCT AND MIXTURE OF SAME WITH UREA-FORMALDEHYDE RESIN
Emil Kaiser and James T. Traxler, Chicago, Ill., assignors, by mesne assignments, to Armour & Company, Chicago, Ill., a corporation of Delaware
No Drawing. Filed Oct. 4, 1956, Ser. No. 613,822
2 Claims. (Cl. 260—45.2)

This invention relates to new synthetic resins and to a process for their preparation. It is more particularly related to resins prepared from substituted hydantoic acids and formaldehyde.

A general object of this invention is to provide new and useful resins. Another object of the invention is to provide a process for the preparation of novel resins. Still another object is to provide a process for preparing useful resins from protein materials. A more specific object is to prepare the new resins from amino acids. Another specific object is to prepare resins by the reaction of formaldehyde and α-substituted hydantoic acids.

According to the present invention a substituted hydantoic acid is caused to react with formaldehyde in the presence of a suitable catalyst.

Amino acids, which may be isolated pure acids or mixtures of amino acids such as are produced by the hydrolysis of a protein, are converted to substituted hydantoic acids by known procedures. Such procedures include boiling the amino acid with urea in an alkaline solution according to the following general formula $$H_2NCONH_2 + H_2NCHRCOONa \xrightarrow{NaOH} H_2NCONHCHRCOONa + NH_3$$

An alternative procedure for converting amino acids into substituted hydantoic acids by the action of potassium cyanate is illustrated by the following formula $$KOCN + H_2NCHRCOOH \rightarrow H_2NCONHCHRCOOK$$

In the above formulas R is either hydrogen or a monovalent radical derived from an amino acid. After the completion of one of these reactions, the reaction mixture is acidified and the precipitated acids removed by filtration.

In carrying out these reactions glycine present in the reaction mixture reacts with urea to form hydantoic acid. Other amino acids, with the exception of proline and hydroxyproline, are converted into substituted hydantoic acids according to the formulas given above. In these reactions proline is converted to a substituted hydantoic acid of the following formula

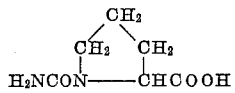

Similarly, hydroxyproline yields a substituted hydantoic acid of the following formula

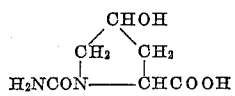

In the preparation of the resin, substituted hydantoic acids are refluxed in a suitable solvent with formaldehyde. A small amount of 85% phosphoric acid has been found to be a very effective catalyst for the reaction.

We have found that the characteristics of the resin produced by the process of our invention may be modified by mixing this novel resin with a known resin such as that produced by the reaction of urea and formaldehyde. A suitable method of preparing such a mixture is to first prepare the substituted hydantoic acid-formaldehyde resin and then to add urea and a solution of formaldehyde to that resin. The urea and formaldehyde is then caused to react in the presence of the new resin. The resulting mixture of resins is very durable and heat resistant. Such a process is illustrated in Example I.

The product and process of the invention is illustrated by the following examples. The reaction temperatures used in this process and in the examples below are not critical, and higher or lower temperatures than those specified may be used if desired.

EXAMPLE I

*Preparation of a Substituted Hydantoic Acid Resin from Leucine*

To a solution of 7.6 g. of sodium hydroxide and 28 ml. of water, 25 g. of d,l-leucine and 25 g. of urea were added. The mixture was refluxed for 2 hours, then cooled, diluted with 56 ml. of water and the product, isobutyl hydantoic acid, was precipitated with 16 ml. of concentrated hydrochloric acid and was filtered off, washed with water and dried. Twenty-eight g. of isobutyl hydantoic acid with a melting point of 182–185° C. was obtained. This product was added to 56 ml. of a 36% aqueous solution of formaldehyde followed by the addition of 2.8 ml. of 85% phosphoric acid. This mixture was refluxed for 7 hours, cooled and diluted with 400 ml. of water. After standing overnight an oil separated and collected at the bottom of the flask. The water was poured off and the oil washed with water by decantation. The washed product was a viscous, light-yellow oil, soluble in acetone, ethanol, aqueous ammonia and alkali. This product, a formaldehyde-isobutyl hydantoic acid resin, remains liquid on standing.

The resin was further processed by mixing it with 20 g. of urea, 40 ml. of 36% aqueous solution of formaldehyde and 2 ml. of 85% phosphoric acid. The mixture solidified within minutes and was freed of water by heating on a steam bath. Fifty g. of a high melting resinous solid was obtained. This material could be used wherever heat-resistant plastics are required. The product is a mixture of two resins, the known urea-formaldehyde resin and the new hydantoic acid-formaldehyde resin.

EXAMPLE II

*Preparation of a Substituted Hydantoic Acid Resin From Protein Hydrolysates*

A commercially available crude protein hydrolysate, the residue of a glutamic acid extraction process, was used in the preparation of the substituted hydantoic acids. In 2.5 l. of tap water, 525 g. of sodium hydroxide was dissolved and 2 kg. of the amino acid mixture in 1.5 kg. of urea was added. After stirring, the mixture was gradually heated to 105° C. in a 12 l. flask. At this temperature ammonia was generated as the mixture refluxed. After 2 hours of refluxing the reaction mixture was cooled to room temperature and acidified with concentrated hydrochloric acid. A total of 1500 ml. of concentrated hydrochloric acid was added with care being taken to avoid excessive foaming. After being kept at room temperature overnight the mixture was filtered. The solid product was washed with 250 ml. of tap water and air dried. This air dried hydantoic acid mixture weighed 1405 g. 1380 g. of the air dried hydantoic acid mixture was placed in a 5 l. flask and was mixed with 2760 ml. of 36% aqueous solution of formaldehyde. The temperature rose to 40° C. The catalyst, 138 ml. of 85% phosphoric acid, was added and the mixture refluxed 5½ hours. The major portion of the water was then distilled off under reduced pressure, the residual water was evaporated in an open dish on the steam bath and the mixture was transferred with acetone to a 5 gal. glass jar. After standing overnight at room temperature the clear upper layer was separated from the dark precipitate. The acetone was then removed by vacuum distillation. The acetone-free residue had a strong smell of formaldehyde. The resin was therefore dissolved in 375 ml. of denatured anhydrous ethanol and the solid again evaporated from a steam bath under reduced pressure. The residue was a sticky resin weighing 1236 g. After standing several days this solid residue took on a shellac-like appearance having a shiny surface. It was soluble in alkali and ammonia.

This resin could be still further polymerized by heating. To illustrate this 525 g. of the polymerized hydantoic acid mixture was transferred to a stainless steel beaker and heated in an oil bath. The resin softened and later foamed at 150 to 160° C. After 10 minutes of heating the beaker was removed from the bath and the resin solidified.

EXAMPLE III

*Modified Method for the Preparation of a Polymerized Hydantoic Acid From Protein Hydrolysate*

52½ g. of sodium hydroxide was dissolved in 250 ml. of water. To this solution 200 g. of the protein hydrolysate described in Example II and 150 g. of urea were added and the mixture was refluxed for 2 hours at 105° C. The mixture was cooled, transferred to a beaker and acidified with 80 ml. of 50% (v./v.) sulfuric acid. After standing overnight, the solids were removed by filtration and without drying were added to 200 ml. of 36% aqueous solution of formaldehyde. 10 ml. of phosphoric acid was added and the mixture refluxed for 5 hours. After standing overnight, a solid resin layer separated above the liquid. The liquid was separated and the solid washed with water. The washed solid was extracted with several portions of boiling 95% denatured alcohol; a total of 1 l. of alcohol was used. Some insoluble material remained in the flask. The alcohol was distilled off and 177 g. of dark brown resin was obtained. This resin was not sticky and dried with a shiny surface.

While in the foregoing description and examples we have set forth certain products and methods of their preparation, it will be understood that such products and methods of preparation may be modified by those skilled in the art without departing from the spirit of our invention.

We claim:

1. The resin reaction product of isobutyl hydantoic acid and formaldehyde.

2. A composition of matter comprising a mixture of the resin reaction product of isobutyl hydantoic acid and formaldehyde, and the resin reaction product of urea and formaldehyde.

References Cited in the file of this patent

UNITED STATES PATENTS

| | | |
|---|---|---|
| 2,155,863 | Jacobson | Apr. 25, 1939 |
| 2,389,416 | D'Alelio | Nov. 20, 1945 |
| 2,447,621 | Smidth | Aug. 24, 1948 |
| 2,872,425 | Paz | Feb. 3, 1959 |